(No Model.)
E. B. W. REICHEL.
TROLLEY SUPPORT FOR ELECTRIC RAILWAY CARS.
No. 536,967. Patented Apr. 2, 1895.
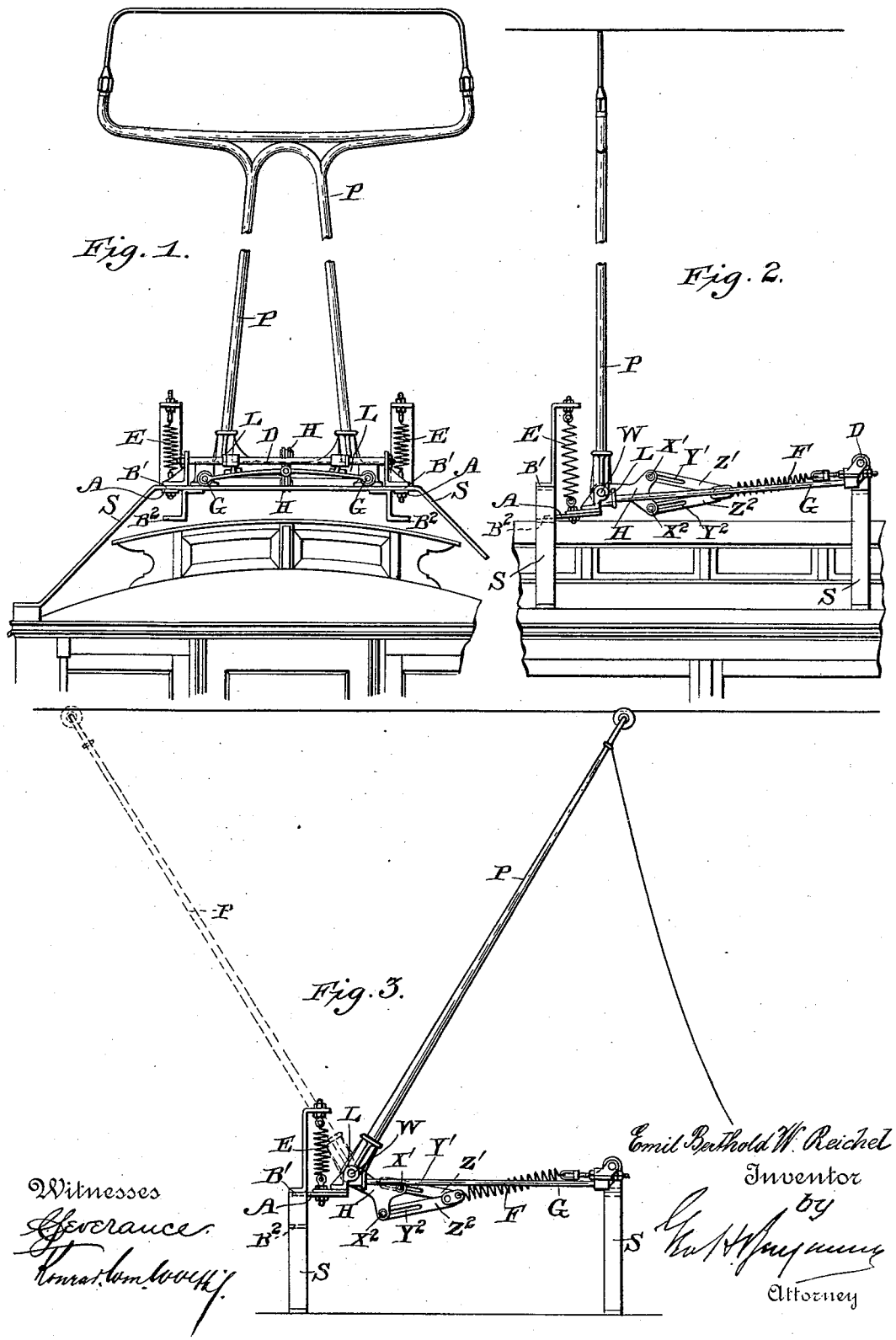

UNITED STATES PATENT OFFICE.

EMIL BERTHOLD WALTER REICHEL, OF CHARLOTTENBURG, ASSIGNOR TO SIEMENS & HALSKE, OF BERLIN, GERMANY.

TROLLEY-SUPPORT FOR ELECTRIC-RAILWAY CARS.

SPECIFICATION forming part of Letters Patent No. 536,967, dated April 2, 1895.

Application filed October 25, 1894. Serial No. 526,939. (No model.)

*To all whom it may concern:*

Be it known that I, EMIL BERTHOLD WALTER REICHEL, a subject of the Emperor of Germany, residing at Charlottenburg, Germany, have invented new and useful Improvements in Trolley-Supports for Electric-Railway Cars, of which the following is a specification.

My invention relates to improvements in trolley supports for electric railway cars in which the contact device is pressed by springs or other suitable means slantingly against the overhead feed-wire, and the object of my invention is to provide a support which shall insure a more constant and unbroken contact and a more uniform pressure between the contact device and the feed-wire than has hitherto been attained, and which shall also facilitate the automatic reversal of the trolley arm from one slanting position, through the vertical, to the opposite slanting position, when the direction of running is changed.

Referring to the drawings, Figure 1 is an end view of my improved trolley support. Fig. 2 is a side elevation of the same, the trolley arm being shown in a vertical position; and Fig. 3 is a similar view showing the trolley arm in an inclined position, showing also a modification of the arrangement adapted for use with a trolley wheel.

On a frame S, affixed to the top of the car, is secured a shaft D upon which is pivoted a frame G carrying, at its vibrating end, bearings L, L, for a rock shaft W, to which is secured the trolley arm P. Springs E, E, secured to an upward extension of the frame S and to an outward extension of the frame G, constantly draw the end of the frame G, and with it the trolley arm P, upward, this movement being limited by a projection A on the frame G adapted to strike against the upper and lower stops B', B². To the rock shaft W is secured a triangular plate H having two studs X', X², which engage slots Y' Y² in the pull-rods Z', Z², which are drawn toward the shaft D by the stretched spring F secured to said rods and shaft.

The tendency of the spring F, acting through either the upper or lower pull-rod, according as the trolley arm leans from or toward the spring, is to draw the trolley arm into a vertical position, and this mechanism for pressing the trolley against the feed-wire in either slanting position is old and well-known. It is, however, defective in this respect, that, unless a very powerful spring F is employed, the trolley arm is not, under the operation of this mechanism, sufficiently quick to follow the variations in the height of the wire above the car top caused by the vertical sway of the car body on its spring supports, and hence there are breaks of contact and sparking between the contact device and the feed-wire, more or less according to the roughness of the road. The tardiness of the trolley to follow and keep in contact with the feed-wire as the car body falls away therefrom in its vertical oscillation is due to the great length and therefore comparatively large moment of inertia of the arm P about its center of oscillation. The inertia of the arm being large, a very powerful spring F is required to rotate the arm about its pivot quick enough to keep contact with the feed-wire, especially on account of the shortness of the arm of the lever H, or of the distance from the shaft W at which the direction of the force of the spring passes. If, on the other hand, a spring is employed powerful enough to preserve contact under sudden changes of relative level, then such spring will exert such resistance to the depression of the trolley when the latter is on the rising grade against the feed-wire, aided, moreover, this time, by the inertia of the trolley arm, which opposes its own downward movement, that a considerable part of the energy of the electro-motor, which should be employed in driving the car, is spent in overcoming the resistance of the successive wave-fronts, so to speak, of the feed-wire, which the car is driven against, the trolley arm not dropping quickly enough on account of the powerful spring employed.

The more nearly the arm P approaches the vertical position, the greater is the arc through which it must be moved by the force of the spring F for its contact end to rise through a given vertical distance, and hence the greater is the liability to tardiness in following the variations in height of the feed-wire, and the consequent sparking.

My improvement, introducing vertical movability of the bearings L, L, and springs E, E, for exerting an upward pressure upon the bearings, provides a second possibility of compensating the vertical oscillation of the car body, which is independent of the relatively slow rotation of the arm P. The springs E, E, which are so calculated that they compensate the weight of the pole P, the bearings L, L, and of the frame G, and also exercise a certain upward pressure, act in the exact direction of motion required, and act to move the whole trolley bodily, and not to turn it about a pivot and can thus compensate a vertical descent faster than is possible by the rotation of the arm P through the force of the spring F. The springs are, moreover, practically constant in the force which they exert, and this force is independent of the direction in which the trolley arm happens to lie.

A further important advantage derived from my invention is that it greatly facilitates the automatic reversal of the trolley upon starting the car upon the return trip.

When the pivot of the trolley arm is immovable, automatic reversal is possible only under favorable conditions, as when the trolley stops midway between the supports for the overhead feed-wire, for then upon starting the car in the reverse direction, the over-head wire can recede from the upward pressure of the trolley arm, until the latter assumes a vertical position, and passes through the vertical to its other slanting position; but should the trolley happen to stop underneath one of the supports for the feed-wire, the latter cannot recede to a sufficient height to allow the trolley arm to swing through the vertical, and automatic reversal does not take place. With my improved support, however, automatic reversal is easily effected, no matter where the car stops, for the trolley arm can be moved bodily downward, and thus can pass through the vertical position under the pressure of the feed-wire, as is illustrated in Fig. 2, and will be moved to its other slanting position by the friction of the feed-wire as the car moves on.

If the described support is to be used with trolleys with wheel contact, the friction of the wheel upon the feed-wire will not be great enough to directly effect the reversal of the pole when changing the running direction. In such cases, I secure to the trolley arm, in a suitable manner, a rope, as shown in Fig. 3, which rope is brought down to the conductor's place. When the direction is to be changed, the conductor carries his end of the rope to the opposite end of the car, or the end in which he will stand on the return journey, so that the rope lies within the acute angle between the trolley arm and the overhead wire and then pulls the rope so as to cause the trolley wheel to bear more heavily against the feed-wire. The frictional resistance between the wheel and feed-wire is thereby so much increased as to hold the top of the trolley back against the feed-wire, and so reverse the slant of the trolley arm in like manner as is effected with trolleys having sliding contact.

Having thus fully described my invention, what I claim, and desire to secure by Letters Patent, is—

1. A support for a contact device of an electric railway car comprising an arm swinging at its lower end upon a horizontal pivot, which pivot is vertically movable and is provided with means for pressing said pivot upwardly, substantially as described.

2. A support for a contact device of an electric railway car comprising an arm swinging upon a pivot at its lower end, and provided with means for exerting upon it an upward pressure the direction of which is independent of the direction of the arm, substantially as described.

3. A support for a contact device of an electric railway car comprising an arm swinging at its lower end upon a horizontal pivot and provided with means for exerting upon said contact device a pressure which is vertical in all positions of the arm, substantially as described.

4. A support for a contact device of an electric railway car comprising an arm swinging at its lower end upon a horizontal pivot, and provided with means for exerting upon said contact device a vertical pressure which is independent of the direction of the arm, substantially as described.

5. A support for a contact device of an electric railway car comprising a vibrating frame extending longitudinally of the car, an arm extending upwardly from the vibrating end of the frame, and movable independently thereof, and a spring resisting the downward movement of the frame, substantially as described.

6. A support for a contact device of an electric railway car comprising an arm pivoted on a vertically swinging frame, a spring resisting the downward movement of said frame, and a stop limiting its upward movement, substantially as described.

7. A support for a contact device of an electric railway car, comprising an arm swinging on a vertically swinging frame, a spring resisting the pivotal movement of the arm from the vertical, and a spring resisting the downward movement of the frame, substantially as described.

8. A support for a contact device of an electric railway car comprising an arm arranged to vibrate longitudinally of the car on a pivot which oscillates vertically, and provided with resilient means for opposing the vibrating movement and with independent resilient means for opposing the oscillatory movement from the normal position, substantially as described.

9. A support for a contact device of an electric railway car comprising a transverse shaft carried on the top of the car, a frame vibrating on said shaft, a vibrating arm on the end of the vibrating frame, a spring secured to the transverse shaft resisting movement of the arm from the vertical, and a spring secured to the top of the car resisting downward movement of the frame, substantially as described.

In testimony whereof I affix my signature in the presence of two witnesses.

EMIL BERTHOLD WALTER REICHEL.

Witnesses:
OSCAR BIELEFELD,
JOHN B. JACKSON.